United States Patent
Thomas et al.

(10) Patent No.: US 6,893,055 B2
(45) Date of Patent: May 17, 2005

(54) SNAP CONNECTION FOR CONNECTING TWO TUBE ENDS

(75) Inventors: Jeltsch Thomas, Domat/Ems (DE); Ralph Kettl, Bonaduz (DE); Willi Mario, Domat/Ems (DE)

(73) Assignee: EMS-Chemie AG, Domat/Ems (CH)

( * ) Notice: Subject to any disclaimer, the term of this patent is extended or adjusted under 35 U.S.C. 154(b) by 0 days.

(21) Appl. No.: 10/611,428

(22) Filed: Jul. 2, 2003

(65) Prior Publication Data

US 2004/0070205 A1 Apr. 15, 2004

(30) Foreign Application Priority Data

Jul. 3, 2002 (CH) ........................................ 20021168/02

(51) Int. Cl.⁷ ................................................. F16L 21/00
(52) U.S. Cl. ...................... 285/319; 285/369; 285/374; 285/417; 285/921
(58) Field of Search ................................ 285/921, 319, 285/321, 369, 374, 417

(56) References Cited

U.S. PATENT DOCUMENTS

| | | | | |
|---|---|---|---|---|
| 5,609,370 A | * | 3/1997 | Szabo et al. ................ | 285/319 |
| 5,765,877 A | * | 6/1998 | Sakane et al. ................ | 285/93 |
| 2001/0040377 A1 | * | 11/2001 | Bandlow et al. ............ | 285/319 |
| 2003/0038480 A1 | * | 2/2003 | Aeberhard ................... | 285/319 |
| 2004/0090066 A1 | * | 5/2004 | Hoffmann ................... | 285/305 |

FOREIGN PATENT DOCUMENTS

| | | | |
|---|---|---|---|
| DE | 3843995 C1 | 12/1988 | |
| DE | 37 27 858 A1 | 1/1989 | |
| EP | 0 750 152 B1 | 12/1996 | |
| GB | 1007746 | 10/1965 | |
| JP | 6-174163 | * 6/1994 | ........... F16L/37/12 |
| JP | 11-201356 | 7/1999 | |

* cited by examiner

Primary Examiner—James M. Hewitt
(74) Attorney, Agent, or Firm—Morgan Lewis & Bockius LLP

(57) ABSTRACT

The snap connection for sealed and releasable connection of a first tube end with a second tube end, with spring arms, with a first outer stop projection on the first tube end, with a first elastically deformable ring connected with the spring arms, and with two first inner stop cams on the first ring cooperating with the first outer stop projection, is characterized by a second outer stop projection on the second tube end, a second elastically deformable ring connected with the spring arms with distance from the first ring, and by two, second inner stop cams on the second ring cooperating with the second outer stop projection. Both rings with their stop cams, connected to one another via the spring arms, form a double-connection element separable by and on both tube ends, which can be made from a plastic injection molding part. The first tube end, for example, can be made by extrusion low-molding and directly assembled with the second tube end, which can be a metal or plastic connecting piece, whereby the connection is fixed in a sealed position after the snapping of the double-connection element.

25 Claims, 2 Drawing Sheets

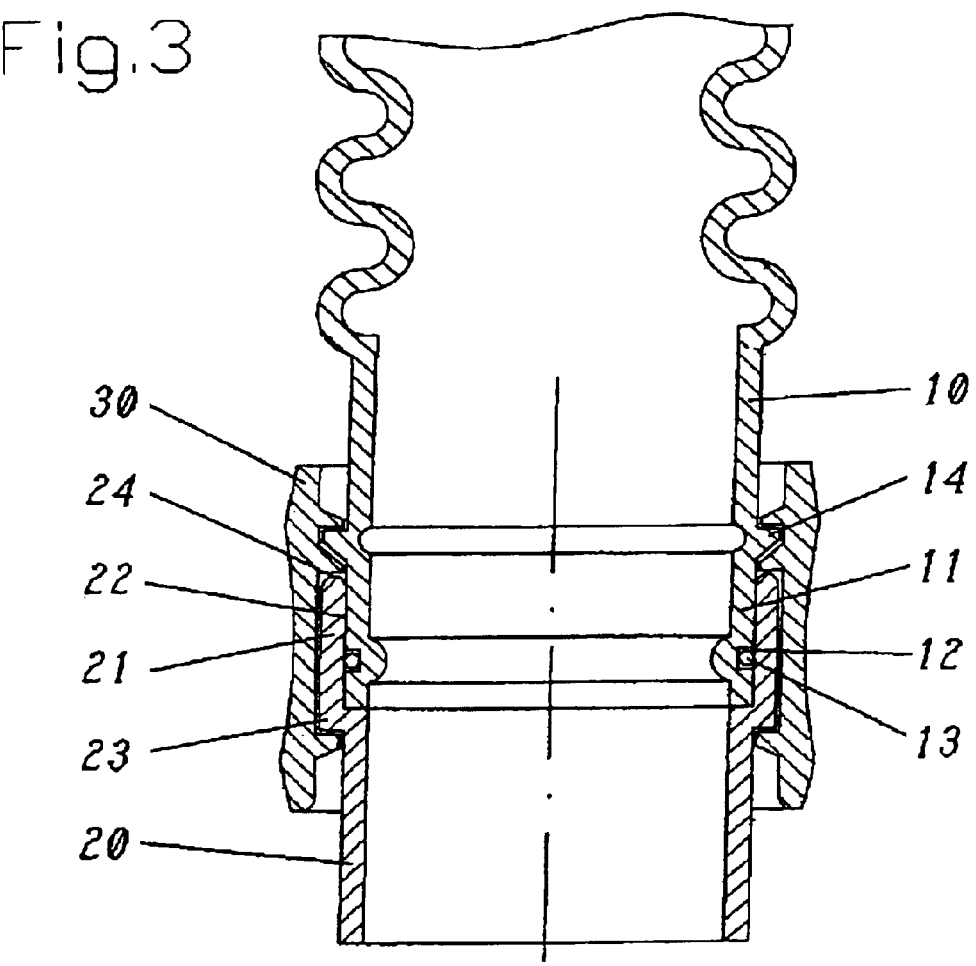

SNAP CONNECTION FOR CONNECTING TWO TUBE ENDS

The present application claims the benefit of Swiss Patent Application No. CH 20021168/02 filed Jul. 3, 2002, which is hereby incorporated by reference.

TECHNICAL FIELD

The present invention relates to a snap connection for sealed and releasable connection of a first tube end with a second tube end, with spring arms, with a first outer stop projection on the first tube end, with a first elastically deformable ring connected with the spring arms, and with two first inner stop cams on the first ring cooperating with the first outer stop projection.

STATE OF THE ART

Snap connections of this type are also designated as "connectors". They are used, for example, in automobile construction, whereby they serve, among other things, for connection of fuel lines or air channels. With the term "channel", closed lines of any cross section are meant, in particular, however, tubes or pipes with a round cross section. Regularly, a connection to a metallic or also a non-metallic tube or a connecting piece is required. Because of the occurring vibrations, it is necessary to form at least a part of the line or channel to be elastically resilient. For this purpose, usually rubber hose is used. Because of its high weight and high price, especially in large-volume air channels, rubber hoses are not very advantageous, however, and are already combined with lighter and cheaper plastic tubes, which, in turn, however, are relatively inflexible. Also, for connection of the plastic tube with the rubber hose, connectors are required. Overall, a relatively complicated structure with multiple sections of different materials and multiple connectors between the sections is provided. This, in turn, requires a high manufacturing expense, a high expenditure for the logistics, as well as high assembly expenditure. The multi-part structure also does not benefit the sealing capability of the line and forces a known minimal length, since the individual components can not be formed as short as desired. Also, with the cramped proportions that are present today in most engine chambers of automobiles, sufficient space for the accessibility of the individual connectors must be provided.

With a snap connection known from DE 37 27 858 C2 or DE 38 43 995 C2 and for a snap connection used for plastic lines of the above-described type, the spring arms are attached with one of their ends to the second tube end and connected with its respective other end with the first elastically deformable ring. In this area, the first inner stop cams are also formed on the ring. The ring with the stop cams as well as the two spring arms is formed as one-piece with the second tube end, which is made from a plastic injection molding part. For connection of a hose, the second tube end is provided with a corresponding connecting piece or adapter.

With a plug connection known from EP 0 750 152 B1, in particular, for connection of rubber hoses with metal or plastic tubes, both tube ends designated as inner and outer sleeves are secured by means of a U-shaped, curved stop spring. This engages with both of its arms from the side through openings in the outer sleeve and in outer grooves on the inner sleeve. With this solution, an extra part is provided with the stop spring, which one must have in hand for making the connection and which must be separated completely from the remaining connection elements for releasing the connection. Because of the lateral engagement of the stop spring, a relatively large amount of space must be provided for making and releasing the connection.

From JP 11201356, a snap connection for a releasable connection of a first tube end with a second tube end is known. On the second tube end, a ring element, which closely encloses the second tube end, such that it is thereby not deformable, is fixedly premounted between two coils. The ring element is provided with four spaced spring arms. On the free ends of the spring arms, respectively, inner stop cams are provided, which cooperate with an outer stop projection on the first tube end.

WO 99/34143 shows, likewise, a solution with a ring element attached to a second tube end, in which, however, the spring arms of the ring element snap from the interior to the exterior into recesses of the first tube end, which overlaps the second tube end partially with distance. The second tube end is flexibly formed and made by extrusion blow molding.

REPRESENTATION OF THE INVENTION

The invention is based on the object of providing a snap connection of the above-noted type, which assumes approved advantages of previously known solutions, can be made simply and rationally, is functionally broadened, and makes possible compact line connections.

The snap connection of the present invention, is characterized by a second, outer stop projection on the second tube end, a second, elastically deformable ring connected with the spring arms with distance from the first ring, and by two, second inner stop cams on the second ring cooperating with the second outer stop projection.

With the snap connection of the present invention, in particular, the following advantages are achieved:

They enable manufacture by simple merging of the two tube ends with automatic snapping of the stop cams.

A sealed connection (in the practical sense) for use of fluids (fluids, steam or gas) is achieved.

For releasing the connection, the two rings must only be compressed by a reverse pressure between the stop cams, and thereby, they are brought into engagement in the area of the spring arms formed on the inner stop cams into outer engagement with the respectively encompassed stop projection. Alternatively, the spread of the spring arms or the ring with a suitable tool is possible. Accordingly, an easy pulling in the axial direction of the connection is sufficient.

The connection is at least substantially symmetrical and can thereby be released on both sides, that is, on one or on the other tube end. In contrast to the solutions known from the state of the art, functionality is thereby doubled. This is advantageous above all for cramped space proportions, such as in engine chambers of motor vehicles today.

Both rings with their inner stop cams and both spring arms form a double-connection element that is separable from both tube ends, and which comes into contact and engagement with both tube ends also only on the outer side. In this connection, a great degree of freedom of selection with regard to the materials used for the double-connection element exists, which is independent of the materials used for the two tube ends and therefore, can be selected without consideration of the medium transported in the tube ends.

The double-connection element can be formed in the axial direction proportionally short. Since the axial length of the entire snap connection is determined essentially by the length of the double-connection element, this is also very short and compact.

The double-connection element can be made particularly cost-effectively as a plastic, injection molding part, whereby the smallest possible dimensions are advantageous. A further advantage is the noted large degree of freedom of choice with reference to the materials used. As suitable injection-molded-capable plastic material for the double-connection element, technical polymers generally come into question. Above all, reinforced polyamides are suited. In this connection, polyamide 6, polyamide 66, polyamide 46, polyamide 11, polyamide 12, as well as partial aromatic, part-crystalline copolyamides (polyphtalamides) are preferred.

As reinforcement means for the polyamide, fibers and/or minerals (for example, mica) can be used. For reinforcement by fibers, for example, glass fibers, carbon fibers, or aramid fibers are suitable, whereby glass fibers are preferred.

According to a further, preferred embodiment of the invention, two further inner stop cams are provided parallel and with distance to the first inner stop cams on the first ring with formation of an engagement recess for the first outer stop projection on the first tube end. The double-connection element 30 can be premounted on the first or second tube end and, for example, can be delivered, transported, stored, and finally assembled together with these elements. For creating and releasing of the connection, the double-connection element need not be detached from the corresponding tube end. Thus, it does not represent a loose, separate part of the connection.

As with previously known connections, also with the connection of the present invention, both tube ends can be formed to be insertable into one another. In this connection, in particular, an end section of the second tube end is widened in stages for receiving an end section of the first tube end, whereby the stepped widening can be used directly as a second outer stop projection. Naturally, also an extra bead or an extra groove could serve as the outer stop projection (as with the first tube end).

The sealing capability of the snap connection can be achieved, for example, in that the end section of the second tube end is provided on the inside with a sealing surface and the end section of the first tube end on the outside, with at least one circumferential sealing groove for at least one sealing element, for example, an O-ring seal. Upon insertion of the two tube ends one into the other, they are sealed by means of at least one sealing element, then, against the noted sealing surface on the second tube end without further features. For a sealing element, also a gasket cord or a lip seal can be used.

As a particular advantage, with the structure of the snap connection of the present invention, the first tube end can be formed as an extrusion blow-molding part from plastic, because there is no need for further structures outside of the first outer stop projection and, if necessary, the noted sealing groove. The outer stop projection as well as the sealing groove must also fulfill predetermined accuracy specifications only with regard to its outer contour and, as the case may be, upper surface composition, which can be fulfilled by blow molding in an outer blow mold without further. In this connection, the implementations are mostly rotationally symmetrical.

As far as the blow-molded tube being provided additionally with simply manufactured ripples with this technology, it is also flexible and can be used directly instead of a rubber hose. Also, the manufacture of such tubes by continuous corrugated tube extrusion is possible, in which, likewise, corresponding end sections can be molded. The tube ends (in particular, the second tube ends) could also be made by injection molding, however, in particular, if it operates as a support on injection molded containers (for example, the housing of an air filter).

As the plastic material for the tubes or for the first tube ends, high viscosity thermoplastic is suitable, which can contain common additives and/or reinforcement means. These molding masses must have a sufficient melting capability for the extrusion blow-molding. According to the application, also heat resistant capability and chemical resistant capability are to be observed. For example, polymers, such as polypropylene, polybutylene-terephthalate or polyphenylene-sulfide come into question. However, polyamides, such as polyamide 6, polyamide 66, polyamide 11, polyamide 12, polyphthalamide, and also polyamide elastomers, as well as mixtures of polyamides are preferred.

According to a further embodiment of the invention, the second tube end is the end of a metal pipe or a metal connecting piece formed on a container. In this case, the noted sealing surface can be particularly accurately manufactured.

The new snap connection, however, is not limited to specialized materials or material pairings. Also, preferably both tube ends can be made of plastic or the first tube end made from metal and the second made from plastic. Also, such a connection for two metal tube ends is also contemplated.

Above all, a very interesting, simple, compact, lightweight, service- and assembly-friendly, as well as cost-effective tube connection for use in automobile construction can be realized by direct connection of a flexible, extrusion, blow-molded tube with a metal connecting piece or plastic tube.

As a further advantage, the snap connection of the present invention is not limited to a small diameter, rather is also particularly suited for a large diameter, such as, for example, those required for air channels, because on both tube ends, no complicated parts or structures must be provided and the double-connection element can be structured very compactly. Thanks to the double-connection element of the present invention, then, a simple, advantageous geometry of the two tube ends is possible.

Also, the manufacture of such tubes by continuous corrugated tube extrusion is possible, as shown in FIG. 3.

SHORT DESCRIPTION OF THE FIGURES

The invention will be described next in greater detail with reference to the accompanying figures. In the figures:

FIG. 3 shows a sectional representation of a snap connection according to the present invention with a double-connection element and corrugated tube end.

MODE FOR CARRYING OUT THE INVENTION

Figure 1:
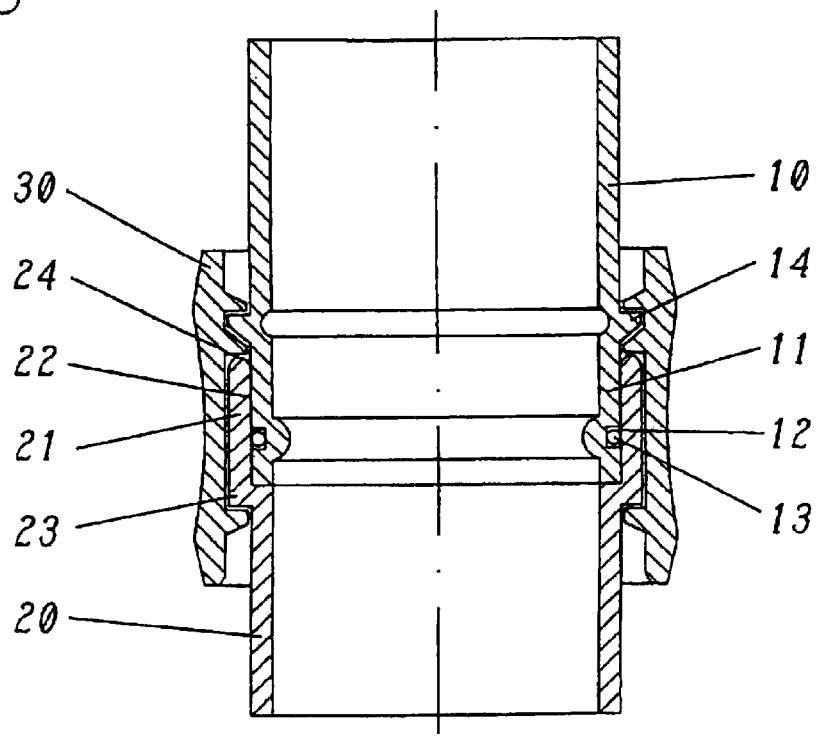
FIG. 1 shows a snap connection according to the present invention with a double-connection element in sectional representation.
Figure 2:
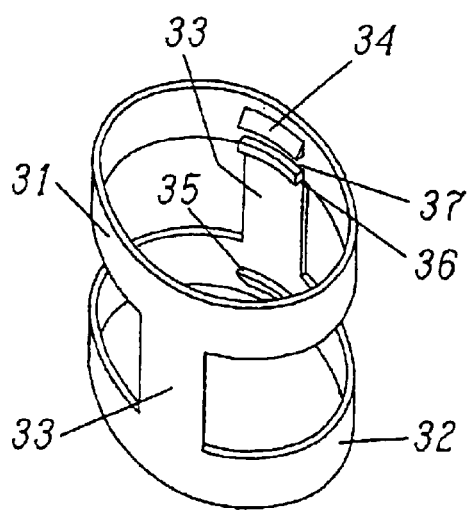
FIG. 2 shows the double-connection element of FIG. 1 in perspective representation.

In FIG. 1, a first tube end is designated with reference numeral 10 and a second tube end is designated with reference numeral 20, in which they can operate, for example, as sections of fuel lines or also of air channels, such as those used in automobile construction, for example.

At least one of the tube ends can operate as a section of a connecting piece, which is attached on a container. Subsequently, with reference to the tube end 10 by way of example, it is assumed that it operates as a section of a flexible tube of an air channel made from a plastic material with a diameter that preferably lies in the range of 30–70 mm. The tube end 20, in contrast, should be a section of a connecting piece of a container made from metal or plastic. These assumptions, however, are only examples, as previously stated, and without limitation of the invention, which applies to all information relating to the figures, as well as for the figure details.

One end section 11 of the first tube end 10 is inserted into an end section 21 of the second tube end 20. The end section 21 is widened for this purpose, whereby the widening is stepped, for the reasons to be described in greater detail below.

The inner surface 22 of the end section 21 is formed as a smooth sealing surface. On the end section 11, on the other hand, on the outer side, a circumferential sealing groove 12 for an O-ring seal 13 is provided. The O-ring seal 13 seals in the sealing groove 12 and against the inner surface 22 and, therewith, the column between the two end sections 11, 12 inserted into one another.

The two tube ends 10, 20 are held together by means of a double-connection element 30. This includes a first elastically deformable ring 31 on the side of the first tube end 10 and on the side of the second tube end 20, a second elastically deformable ring 32. Both rings 31, 32 are connected to one another via two diametrically opposed spring arms 33. There, where the spring arms 33 are connected with the rings 31, 32, inner stop cams are provided on the rings 31, 32 (as the case may be, also on the ends of the spring arms) on the inner side, and indeed, on the first ring 31, first inner stop cams 34 and on the second ring 32, second inner stop cams 35. The stop cams 34 and 35 are provided on their sides facing toward one another, respectively, with outwardly directed stop surfaces in the cross sectional plane of the double-connection element and on their sides facing away from one another, respectively, on the other hand, with projecting deflecting surfaces. Parallel to the first stop cams 34 and with minimal distance from these, two further stop cams 36 are formed on the inside with engagement grooves 37 on the first ring 31.

FIG. 1 shows the snap connection of the present invention in a connected stated. In this state, the connection is protected against unplanned release from the action of axially-acting pulling forces. Both tube ends, however, can be twisted against one another when in this state when needed, when they are rotationally-symmetrically formed, whereby, however, the assembly takes place generally from the beginning in the correct angular position.

In known cases, an exact assembly without the possibility of twisting is desired. This can be achieved by means of a non-rotationally symmetrical structure of the tube ends, so that the twisting is prevented by a positive fit or the tubes are protected against twisting.

For assembly of the connection of the present invention, in a first step, for example, the first tube end 10 is inserted into the (thereby fixed) double-connection element 30 on the side of the first ring 31. As soon as the first stop projection 14 comes into contact with the deflection surface of the first stop cams 34, these are bent out from one another with the further movement with deformation of the first ring 31 and with deformation of both spring arms 33, until they spring back behind the stop projection 15 and can snap in. The stop projection 14 also comes into engagement with the engagement grooves 37, whereby the first tube end 31 cannot be advanced further. In this position, the first tube end 10 and the double-connection element 30 are attached relative to one another. One could also say that the double-connection element is pre-mounted onto the first tube end.

As a second step for making the connection, the second tube end 20 is inserted in the reverse direction and by receiving the first tube end 10 or its end section 11 in the double-connection element 30, until the second inner stop cams 35 on the second ring 32 snap in behind the second outer stop projection 23 of the second tube end 20, in connection with the first tube end in the previously described manner in the insertion direction. With its front edge 24, the second tube end 20 comes into contact simultaneously on the further stop cams 36, which limit therewith also the further inserting movement of the second tube end 20 after snapping in. By use of the O-ring seal, a sealing of the two tube ends 10, 20 against the outside is directly achieved.

It should also be noted specifically here, however, that the assembly of the connection of the present invention can be done just as well also in the reverse order. That is, in a first step, the double-connection element 30 also can be shoved with the ring 32 onto the second tube end 20 and in a second step, the first tube end 10 can be inserted.

The connection of the present invention can be released on the first ring 31 or on the second ring 32 and thus, the respective ring is so highly deformed by pressure exertion between the stop cams, such that the inner stop cams provided on it comes into outer engagement with the respective stop projection, which they engage behind. As the case may be, also a tool for spreading the spring arms or the ring in the area of the stop cams can be used, for example, a spreading gripper, which is attached from the axial ends of the ring. Subsequently, the tube end associated with the respective ring can be pulled out from the double-connection element 30.

The double-connection element 30 is proportionally compact and is preferably made as a plastic, injection molded part.

The first tube end 10 or the entire assembled part can be made by extrusion blow-molding. In this manner, the tube is widened after extruding, as long as it is still soft and moldable, under inner pressure in an outer mold, which in the present case, at least must have the corresponding contour in the form of a groove for the first stop projection 14 and in the form of a sealing groove 12.

The snap connection of the present invention, comprising the two tube ends and the double-connection element, is particularly preferred for use as an air channel connection for the intake or charging area of an automobile engine. Of the charging areas, turbo-charged engines are noted.

REFERENCE NUMERAL LIST

10 first tube end
11 end section of the first tube end
12 sealing groove
13 sealing element (for example, O-ring)
14 first outer stop projection on the first tube end 10
20 second tube end
21 end section of the second tube end 20
22 inner surface of the end section 21
23 second outer stop projection on the second tube end 20
24 front edge of the second tube end
30 double-connection element
31 first elastically deformable ring 32 second elastically deformable ring
33 spring arms
34 first inner stop cams
35 second inner stop cams
36 further inner stop cams
37 engagement groove

What is claimed is:

1. A snap connection for sealed and releasable connection of a first tube end with a second tube end, with spring arms, with a first outer stop projection on the first tube end, with a first elastically deformable ring connected with the spring arms, and with two first inner stop cams on the first ring cooperating with the first outer stop projection, characterized by a second outer stop projection on the second tube end, a second elastically deformable ring connected with the spring arms and distanced from the first ring, and by two, second inner stop cams on the second ring cooperating with the second outer stop projection.

2. The snap connection according to claim 1, characterized in that the spring arms, the rings connected to it, as well as the inner stop cams from a double-connection element.

3. The snap connection according to claim 2, characterized in that the double-connection element is made as a plastic, injection molding part.

4. The snap connection according to claim 3, characterized in that for the plastic, injection molding part as plastic material, a reinforced polyamide is used.

5. The snap connection according to claim 4, characterized in that the polyamide is selected from the group consisting of polyamide 6, polyamide 66, polyamide 46, polyamide 11, polyamide 12, and partially aromatic, part-crystalline copolyamides.

6. The snap connection according to claim 4 or 5, characterized in that at least one of fibers and/or minerals are used as reinforcement means for the polyamide.

7. The snap connection according to claim 6, characterized in that the fibers are selected from the group consisting of glass fibers, carbon fibers, and aramid fibers.

8. The snap connection according to claim 1, characterized in that two further inner stop cams are provided parallel and distanced from the first inner stop cams on the first ring with formation of an engagement groove for the first outer stop projection on the first tube end.

9. The snap connection according to claim 1, characterized in that one of the tube ends can be inserted into the other tube end.

10. The snap connection according to claim 9, characterized in that an end section of the second tube end is widened in stages for receiving an end section of the first tube end and that the stepped widening forms the second outer stop projection.

11. The snap connection according to claim 9 or 10, characterized in that the end section of the second tube end is provided on the inside with a sealing surface.

12. The snap connection according to claim 9, characterized in that on the outside of the end section of the first tube end, at least one circumferential sealing groove for at least one sealing element is provided, wherein said at least one sealing element is preferably an O-ring, a gasket cord, or a lip seal.

13. The snap connection according to claim 1, characterized in that at least one of the first and/or the second tube ends comprises a plastic.

14. The snap connection according to claim 13, characterized in that the plastic is selected from the group consisting of polypropylene, polybutylene-terephthalate, polyphenylene-sulfide, and polyamides, wherein these polymers also contain at least one of additives and reinforcement means.

15. The snap connection according to claim 14, characterized in that the polyamides include the group polyamide 6, polyamide 66, polyamide 11, polyamide 12, polyphthalamides, polyamide elastomers, and polyamide mixtures.

16. The snap connection according to one of claims 13–15, characterized in that the first tube end is an extrusion blow-molding part.

17. The snap connection according to one of claims 13–15, characterized in that the first tube end is part of a continually extruded corrugated tube.

18. The snap connection according to one of claims 13–15, characterized in that the second tube end is an injected molding part.

19. The snap connection according to claim 1, characterized in that the second tube end is a metal part.

20. The snap connection according to claim 1, characterized in that the diameter of the two tube ends lies in the range of 30 to 70 mm.

21. The snap connection according to claim 1, characterized in that the two tube ends are formed to be rotationally symmetrical.

22. The snap connection according to claim 1, characterized in that both tube ends are protected against twisting by means of a non-rotationally symmetrical design.

23. The snap connection according to claim 1, characterized in that it is an air channel connection for the intake or charging area of an automobile engine.

24. The snap connection according to claim 18 wherein the injection molding part comprises a connection piece on an injection-molded container.

25. The snap connection according to claim 19 wherein the metal part comprises a metal connecting part.

* * * * *

UNITED STATES PATENT AND TRADEMARK OFFICE
CERTIFICATE OF CORRECTION

| | | |
|---|---|---|
| PATENT NO. | : 6,893,055 B2 | Page 1 of 1 |
| APPLICATION NO. | : 10/611428 | |
| DATED | : May 17, 2005 | |
| INVENTOR(S) | : Thomas Jeltsch et al. | |

It is certified that error appears in the above-identified patent and that said Letters Patent is hereby corrected as shown below:

Title Page
Item [12], should read

--Jeltsch et al.--

Item [75], Inventors, should read

--Thomas JELTSCH, Domat/Ems CH); Mario WILLI, Domat/Ems (CH); Ralph KETTL, Bonaduz (CH)--

Signed and Sealed this

Ninth Day of January, 2007

JON W. DUDAS
*Director of the United States Patent and Trademark Office*